No. 657,143. Patented Sept. 4, 1900.
R. P. TOMPKINS.
CHURN.
(Application filed Apr. 5, 1898.)
(No Model.)
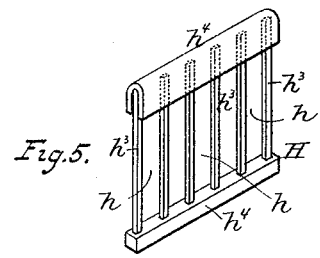
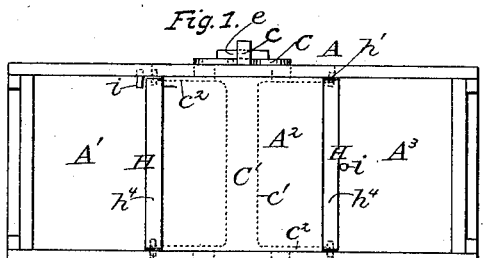
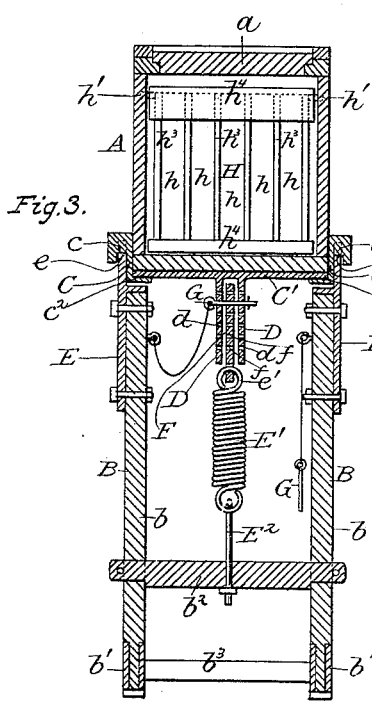
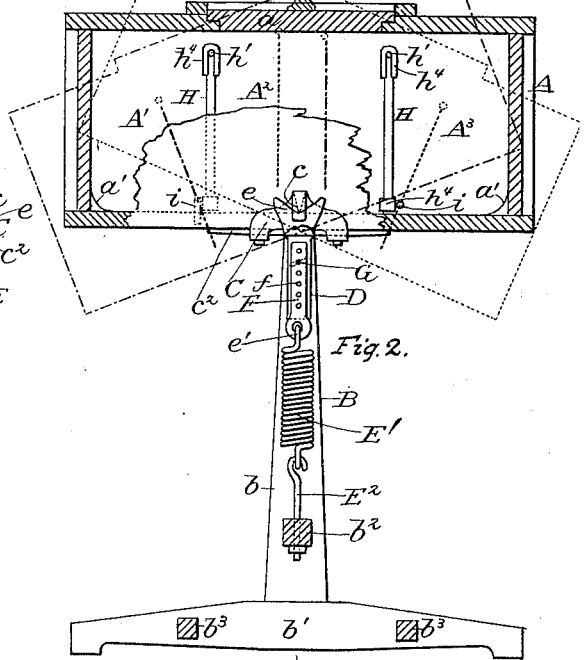
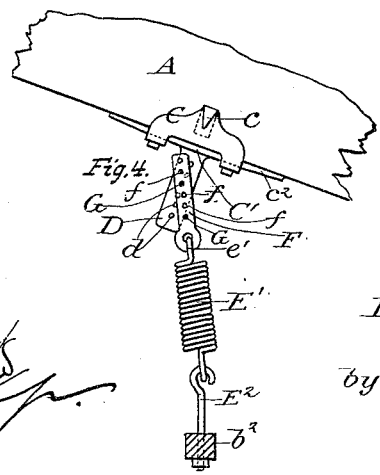
Witnesses.
Charly Srekrik
A. Selkirk
Roney P. Tompkins,
Inventor
by Alex. Selkirk
Attorney

UNITED STATES PATENT OFFICE.

RONEY P. TOMPKINS, OF ALBANY, NEW YORK.

CHURN.

SPECIFICATION forming part of Letters Patent No. 657,143, dated September 4, 1900.

Application filed April 5, 1898. Serial No. 676,528. (No model.)

*To all whom it may concern:*

Be it known that I, RONEY P. TOMPKINS, a citizen of the United States, residing at Albany, in the county of Albany and State of New York, have invented certain new and useful Improvements in Churns, of which the following is a specification.

My invention relates to churns of the class known as "oscillating;" and it consists in the novel construction and combinations and arrangements of parts, as will be hereinafter fully set forth, and pointed out in the claims.

The objects of my invention are to provide, with a rectangular oblong vessel and within its chamber, vertical open-work gates, which are suspended from their upper portions so as to adapt them to be automatically oscillated from predetermined points toward the middle point in the length of the chamber when the vessel is oscillated vertically; also, to provide, with the vessel, a suitable supporting-frame from which it may be oscillated, and a pendent arm fixed to the vessel, a reacting spring connected with the supporting-frame, and a link adjustably connected with the pendent arm and said spring, and also to provide, with the vessel and its supporting-frame, coacting fulcrums and bearing-seats, reacting spring, horizontal vibrating arm, and an adjustable pivot-link between the latter and the reacting spring, all for coaction for effecting an easy operation of the churn.

Other objects and advantages of the invention will be fully understood from the following description and claims, when taken in connection with the accompanying drawings, in which—

Figure 1 is a plan view of a churn embodying the improvements in my invention, with the top wall of the vessel removed for showing interior parts. Fig. 2 is an elevation of the same with parts in section. Fig. 3 is a sectional view taken in the transverse and at line 1 in Fig. 2. Fig. 4 is a view of the reacting spring, pendent arm of the vessel, and the adjustably-connected link between said arm and spring, and illustrates their operations with each other and the vessel; and Fig. 5 is a perspective view of an open-work oscillating gate made with my preferred form for use in the chamber of the cream vessel.

The same letters of reference refer to similar parts throughout the several views.

In the drawings, A is the cream vessel, made of any suitable material, yet preferably of wood. This vessel is of oblong rectangular form and is provided with an opening which is provided with a close-fitting cover. Through opening the cream to be churned is to be introduced to within the vessel and the butter is to be removed therefrom. The lower corners of the chamber of the vessel are shown in Fig. 2 to be concave in form, and a suitable perforation is provided in one end wall of the vessel for convenience for drawing off the liquid after churning, which perforation may be closed by a suitable plug or stopper.

B is a suitable supporting-frame, which may be made of wood or iron, or both those materials combined, and be of any preferred form of construction, yet I at present prefer to make this frame comprise vertical standards $b\ b$, horizontal base-bars $b'\ b'$, and connecting-bars $b^2$ and $b^3$, suitably secured together.

The vessel A is mounted on the frame B at a point at the middle of its length, as shown in Figs. 1 and 2, and by means of any suitable mechanism this vessel A may be supported from the upper end of the frame without liability of shifting in any direction. At present I prefer to employ a mechanism comprising the knife-edge-form fulcrums $c\ c$, Figs. 1, 2, 3, and 4, preferably made integral with side plates C, secured to the vessel at its middle of length and also preferably secured to the vessel-supporting piece C′, comprising the cross-bar $c'$ and end bars $c^2$, preferably all integral when made of metal, as indicated in part by dotted lines in Fig. 1 and shown by full lines in Figs. 2, 3, and 4. These knife-edge-form fulcrums have bearings on V-shaped seats $e$, Figs. 1 and 2, provided on the upper ends of the side plates E, secured to the upper ends of the standards $b$ of the frame. The vessel-supporting piece C′, preferably consisting of a single piece (when made of metal) comprising cross-bar $c'$ and transverse end bars $c^2\ c^2$, as indicated by dotted lines in Fig. 1, is secured to the lower side wall or bottom of vessel A by means of bolts or other known means. Although this piece C' is shown to be made separate from the side pieces C and secured thereto, yet it may be made integral with the latter, while the side plates or pieces C may be made with any preferred form which may permit the fulcrums c to be in situation above the plane of the lower side wall or bottom of vessel A.

D D are pendent arms, shown in Fig. 3 to be integral with the supporting-pieces C', yet they may be made separate and independent of said piece and be secured thereto by bolts or rivets, if preferred. These pendent arms D D, taken together, compose a bifurcated arm, are made with a suitable length, and preferably are provided with a series of pivot-holes $d\,d$, about one inch or more or less apart, although only a single pivot-hole may be provided when adjustability of a connecting-link, hereinafter described, is to be omitted. Two parallel pendent arms D are shown in Fig. 3, yet a single arm may be employed.

E' is a reacting tension-spring having a suitable joint-form connection with a stationary part of frame B, which may consist of the eye $e$, provided with the lower end of the said spring and engaging with an eye or hook bolt E, secured to a fixed piece, as, say, cross-bar $b^2$. This reacting spring is preferably in the form of a spiral tension-spring and has a joint-form connection by its upper end with the pendent arm or arms D. Although this joint connection with said arm may be made by extending a suitable length of upper end portion of the wire of said spring (not shown) connecting the eye $e'$, formed therewith to the said pendent arm or arms at a point at a short distance below the line of the plane of the lower side of the bottom of said vessel A and at which it may be preferred to locate the pivot-joint with said arm for general use, yet I prefer to employ between the reacting spring and arm D the adjustable pivot-link F, which link may be of any suitable form and provided with a series of pivot-holes $f\,f$ in number and at intervals in correspondence with the pivot-holes $d\,d$ in pendent arms D and has in its lower end portion a suitable connecting-eye $d'$ (or hook) for engagement with the eye $e'$, provided with the upper end of spring $E^2$.

G G are pivot-pins, two in number, designed to be used one at a time and alternately as a pivot between said link F and the pendent arm or arms D and at other times simultaneously for joint coöperation with the said link and arms whenever the operator changes the location of the pivot in said arms and link and also when he sets the vessel inclined in either direction, as may be preferred and as illustrated in Fig. 4. Figs. 2 and 3 show one of these pivot-pins G in place in the second holes $d$ and $f$ of the arm and link, and with this use of a single pivot-pin G the vessel A is ready to be oscillated for churning.

H H are oscillating open-work gates made of any suitable material, preferably of wood, and with any suitable number and form of openings $h$, which may serve as restricting passages or ways through which the agitated cream may at each oscillation be made to have passage from the higher end portion of the chamber of the vessel to the lower end portion of the same. These gates are so suspended by their upper end portions within the chamber of the vessel A as to allow them to be freely oscillated in either direction, accordingly as that vessel is itself oscillated. At present I prefer to suspend these gates from pins $h'\,h'$, Figs. 1 and 3, shown to be provided with the side walls of the vessel and working in suitable pivot openings or seats provided in the upper portion of the ends of said gates. I also at present prefer to form the openings $h$ in the form of vertical slots occurring between vertical bars $h'$ and having their respective ends secured to cross-bars $h^4$, as shown in Figs. 3 and 5. These gates H are shown in Figs. 1 and 2 to be located one at each side of the opening $a$ to the chamber of the vessel and so as to divide the said chamber into three subchambers $A'\,A^2\,A^3$, and they are prevented from oscillating past a perpendicular in direction toward the end walls they are nearest to and by means of suitable stops $i\,i$, fixed to the side walls or bottom of the vessel. When the vessel A is in a horizontal position, as shown by full lines in Fig. 2, these gates H are relatively parallel with the end walls of the vessel and perpendicular to the plane of the bottom of the vessel, while when the vessel is in an incline position, as indicated by both dotted and broken lines in the same figure, the gates H nearest the elevated end wall will be swung from a line parallel with such end wall toward the point of middle of length of the vessel, while the gate H nearest the depressed end wall will be held in place by the stops $i$ and relatively parallel with said depressed end wall. In the alternate oscillations of the vessel these gates will respectively automatically and alternately oscillate to and from parallel positions in relation to the respective end walls, as indicated by full and dotted lines in Fig. 2.

When the smallest quantity of cream—say one gallon—is to be churned, the pivot-pin G, pivoting the link F to the arms D, will be applied to the uppermost pivot-holes $d$ and $f$ of the series in said pieces, when the point of pivotal connection of the said parts will be at such a distance below the plane of the points of bearing of the fulcrums $c\,c$ on their seats $e$ as to render the reacting spring E capable of holding the vessel A horizontal when not being oscillated and also capable of exerting such a considerable elastic force for raising the depressed end portion of the vessel and the bulk of the cream temporarily occupying such depressed portion to an elevated position which is adapted to quickly and forcibly discharge the cream therefrom and into the opposite end portion of the vessel when being in its turn depressed. When the charge of cream is greater—say three, four, or six gallons—the pivot-pin G will be set correspondingly lower down from the plane of the fulcrums $c$ on their seats $e$—as, say, for the three-gallon charge the pivot-pin G will be set at the third pivot-holes $d$ and $f$ in arms D and link F, for a four-gallon charge at the fourth pair of pivot-holes $d\,f$, and for a six-gallon charge at the sixth pair of said pivot-holes in those parts from their upper ends—whereby the point of the pull of the reacting spring E may be at a distance from fulcrum $c$ proportionate to the charge, so that the arms D, operating as a lever, may be lengthened from the fulcrum $c$ to the pivot-holes $d$ the pivot-pin is in, and the spring E be made thereby to be effective for exerting its elastic force for quickly lifting the depressed end of the vessel and forcibly discharge the charge of cream into the opposite end of the vessel. At each forcible discharge of the cream from one end portion of the vessel through both the open and closed gates H H into the opposite end portion of the vessel the sacks holding the butter will become gradually broken, and as the operation of oscillation of the churn is continued these sacks of butter in the charge of cream will continue to be broken until the churning is finished and all the butter has been extracted from the cream.

This churn may be operated by hand or other power, as may be preferred. In Fig. 1 are shown handles J J, secured to a side of the vessel A for convenience of the operator for oscillating the vessel; yet it is evident that this vessel may be oscillated by means of a revolving crank or eccentric and pitman actuated by a driven pulley or a hand-crank (not shown) without involving invention or departing from the spirit of this invention. It is also apparent that the vessel A may be made with forms other than the preferred and the above-described form when they are adapted to be oscillated for use with the above-described open-work gates, reacting spring and arms D having a pivot-form connection with said spring, as described, without departure from the spirit of this invention.

When it is desired to change the point of application of a pivot-pin G from one pair of registering pivot-holes $d\,f$ to another pair—as, say, from the second pair of holes to the fourth pair below the upper ends of the parts D and F—the operator will, while the vessel is in horizontal position and one of the pins $i$ is in place in the second pair of holes $f\,d$, as shown in Figs. 2 and 3, pass the other one of the two pins G G through the fourth pair of holes $d\,f$ and then withdraw the first pin from the second pair of holes, leaving the other pin G in place in the fourth pair of holes, when the adjustment will be made for churning a larger charge of cream. This mode of procedure by alternating the use of the pins G G, as described, will be practiced for changing the pivotal points in parts D and F for larger or smaller charges of cream as they may be introduced into the churn.

When it is desired to hold the vessel in an inclined position, one of the pins $i$ will be in place in one pair of pivot-holes $d\,f$—as, say, in the third pair, (shown in Fig. 4)—when the vessel will be turned to the inclined position selected, and the second pin will be passed through such holes $d$ of part D as may be at the edge (above or below the plane of the first pin) of part F, which in Fig. 4 is shown to be the sixth hole in said part F, when the vessel will be held at the desired inclined position.

When the churning of the cream is finished, the vessel will be gently oscillated, so as to gather the butter particles in one mass within the part of the main chamber of the vessel which is between the gates H H.

This invention substantially as shown may be employed with great advantage for washing fabrics.

Having described my invention, what I claim, and desire to secure by Letters Patent, is—

1. The combination with a supporting-frame, a horizontally-oscillating vessel, fulcrums secured to the sides of said vessel and bearing-seats provided with the upper end of said frame, of a pendent arm D secured to the lower side of the vessel and a reacting spring having a joint-form connection with said frame and a link F between said reacting spring and said pendent arm and having a loose-joint connection with each, substantially as and for the purposes set forth.

2. The combination with a supporting-frame, a horizontal oscillating vessel, fulcrums secured to the sides of said vessel and bearing-seats provided with the upper end of said frame, of a pendent arm secured to the said vessel and provided with two or more pivot-holes $d$, a reacting spring having a joint-form connection with the frame, a link provided with two or more pivot-holes $f\,f$, and having a joint-form connection with the upper end of said spring and two pivot-pins adapted to be used simultaneously, substantially as and for the purposes set forth.

RONEY P. TOMPKINS.

Witnesses:
A. SELKIRK, Jr.,
CHARLES SELKIRK.